Figure 3:
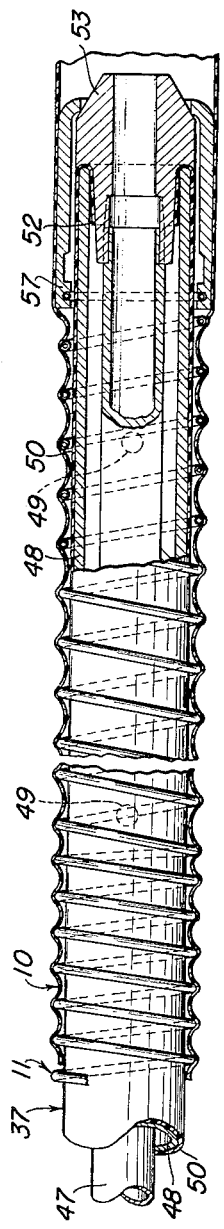

July 2, 1957
F. A. MARTIN
2,797,730
METHOD AND APPARATUS FOR MAKING AN EXTENSIBLE FLEXIBLE HOSE
Original Filed Nov. 24, 1954
3 Sheets-Sheet 1
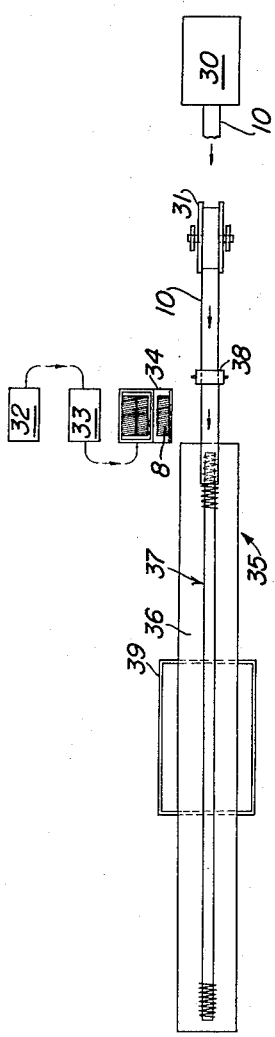
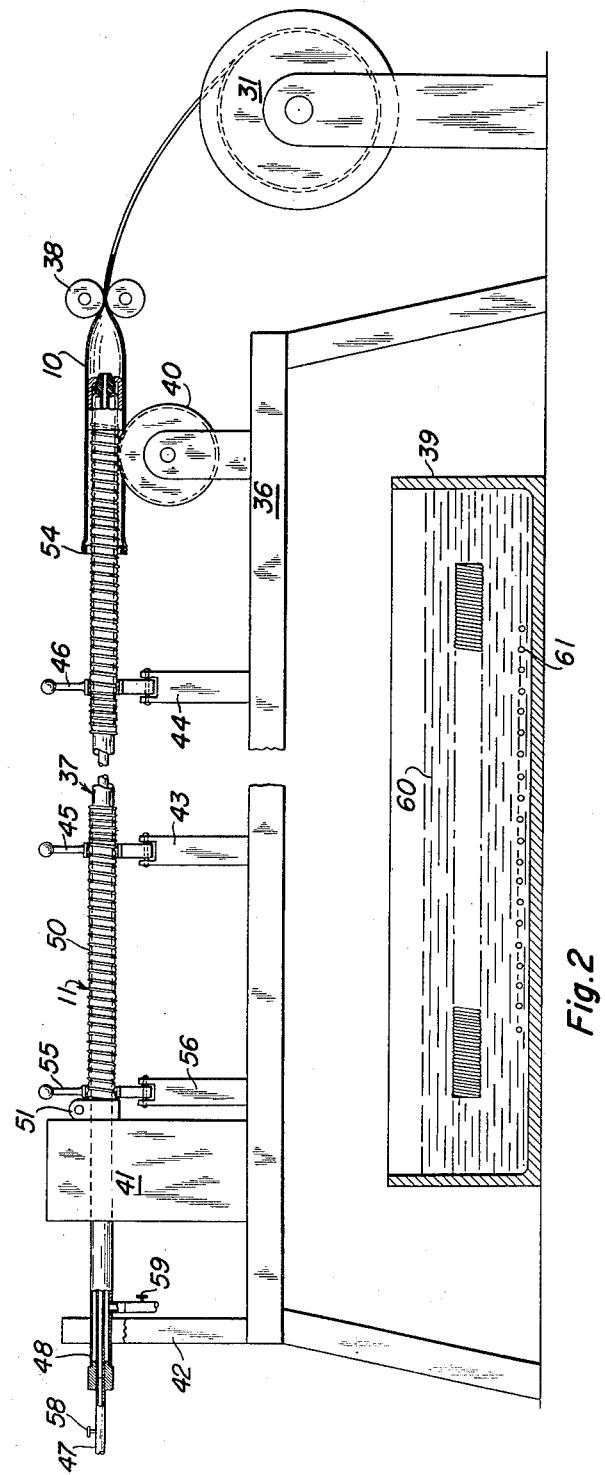

United States Patent Office 2,797,730
Patented July 2, 1957

2,797,730

METHOD AND APPARATUS FOR MAKING AN EXTENSIBLE FLEXIBLE HOSE

Frank A. Martin, Akron, Ohio, assignor to The Hoover Company, North Canton, Ohio, a corporation of Ohio Continuation of application Serial No. 470,895, November 24, 1954. This application December 6, 1955, Serial No. 551,382

19 Claims. (Cl. 154—7)

The present application is a continuation of my copending application, Serial No. 470,895, filed November 24, 1954, now abandoned.

The present invention relates to the method of and apparatus for making an extensible flexible hose from a cylindrical spirally wound reinforcing element and a thin-walled thermoplastic tubing having an inside diameter less than that of the coiled reinforcing element.

The present application is an improvement over a copending application by Jack E. Duff, Serial No. 459,990, filed October 4, 1954.

According to one aspect of the present invention a cylindrical spirally wound reinforcing element is stretched lengthwise to space the turns thereof apart so that they have a tendency to return toward each other and the turns are interiorly held in their stretched or expanded position while the tube is expanded and slid over the stretched coil and permitted to contract about the turns of the coil to hold them in their spaced position. Thereafter, the internal anchoring of the turns is released permitting them to move toward each other as far as permitted by the wall of the tube which will move inwardly in a spiral corrugation lying between adjacent turns of the coil. Thereafter, heat is applied to soften the wall of the tube and relax the stresses therein permitting the turns of the coil to move farther toward each other and to cause the wall of the tube to move further inwardly into a deep spiral fold or corrugation lying between adjacent turns of the coil and extending inwardly beyond the inner periphery of the coil. The assembly is then cooled to room temperature which will give the tube wall a permanent set in its deeply folded condition whereby the finished hose will be readily extensible.

Specifically, according to the present invention the coiled reinforcing element is stretched over an expansible arbor and the end turns fixed. If a hose having a uniform fold or corrugation depth is desired, the arbor is then expanded to interiorly anchor the turns of the coil in their spaced positions after which the end turns of the coil are released and the process continued as before. If deeper folds are desired at the ends of the finished hose a selected turn of the coil spaced from the ends of the coil is moved toward the mid-portion thereof to space the end turns of the coil farther apart than those at the mid-portion, the selected turns are exteriorly anchored to the arbor, the arbor expanded to interiorly anchor the turns in their differentially spaced relationship, the exterior clamps are removed and the process continued as before.

If it is desired to have a hose in which there is no corrugation or fold in the end, a selected turn spaced from the end or ends is moved toward the ends of the coil to bring the end turns into contact with each other, the selected turns are clamped exteriorly to the arbor, the arbor is expanded to interiorly anchor the turns in their differentially spaced relationship, the external clamps are removed and the process continued as before.

The arbor of the present invention includes an inflatable expansible tube or covering which is expansible peripherally but nonexpansible axially whereby when it is expanded within the spaced turns of the stretched coil it will bulge outwardly between the turns of the coil and interiorly anchor them in their spaced relationship.

In a complete continuous process according to the present invention, an indefinite length of a thin-walled thermoplastic tubing is extruded and placed on a reel with the free end of the tube extending thru a pair of pinch rolls at the rear of an assembly machine, the purpose of the pinch rolls being to seal off a length of tubing as will presently appear. At the same time a thin sheath of thermoplastic material is extruded over a reinforcing wire which is then fed to a wire coiler where the sheathed wire is tightly coiled into a cylindrical spiral having a larger inside diameter than the thin-walled thermoplastic tubing and with the turns of the coil pressing against each other. The coil of sheathed wire is then cut to suitable lengths of approximately 500 coils per length and about 39 to 40 inches long and stored in a storage hopper and rack adjacent the rear of the assembly machine.

One length of the tightly coiled sheathed spring is placed on an expanding arbor on the assembly machine and one end turn of the coil fixed relative to one end of the arbor. The spring is then stretched lengthwise on the mandrel or arbor to a length of about 207 inches and its other end anchored relative to the mandrel. The 30th turn from each end turn is then moved toward the center of the mandrel to space the 30 end turns at each end of the coil farther apart than the spacing of the turns at the mid-portion of the coil, the 30th coil then being exteriorly clamped to the arbor to anchor the coil turns in their differentially spaced position. The resultant spacing of the turns is approximately 0.55" for the turns at each end of the coil and approximately 0.40" for the central turns.

The arbor or mandrel is then expanded to interiorly anchor the coil turns in their differentially spaced position. The end turns of the coil and the 30th turn from the ends then being interiorly anchored, the external clamp for those coils are released leaving the coil differentially spaced along the length of the arbor and leaving its exterior surface otherwise free.

The free end of the thermoplastic tube extending beyond the pinch rolls is then mechanically expanded and inserted over the free end of the mandrel and inflated, the pinch rolls serving to close the rear end of the tube. The inflated tube is then pulled over the mandrel on top of the expanded coil for the full length of the latter and deflated. The inflated tube upon being pulled over the expanded spring and arbor will also be extended axially to some extent. The inside diameter of the tube being less than that of the coil, the tube will contract about the turns of the coil and also about the arbor between the turns of the coil. The contraction of the tube will thus exteriorly anchor the turns of the coil in their differentially spaced position and the interior anchor is then released by contracting the arbor.

Since the end and 30th turns were previously released exteriorly, the release of the internal anchor for the turns of the coil will permit them to move toward each other as far as permitted by the wall of the tube under the natural tendency of the coil to return to its originally close wound position. As the coil contracts lengthwise the wall of the tube will contract radially and circumferentially between the turns of the coil to form inwardly and outwardly facing spiral folds or valleys extending the full length of the tube, the turns of the coil lying within the inwardly facing fold or valley and the walls forming the outwardly facing fold lying between the turns of the coil. The expanded coil and tube will contract from 207 inches to 100 inches approximately.

The partially contracted carcass is then removed from the arbor and placed in a bath of warm water beneath the assembly machine at a temperature of from 150° to 180° F. The tube will tend to contract lengthwise and, its original internal diameter being less than that of the coil, it will also tend to contract radially and circumferentially.

The heat applied will soften the material of the tube and release the stresses therein and permit the coil to contract lengthwise to the maximum extent possible being spaced only by the walls of the tube which connect the inwardly and outwardly facing spiral folds or valleys in the tube wall. The wall of the tube thus contracts inwardly so that the inner crest of the outwardly facing fold lies inwardly of the inner periphery of the coil, forming inwardly extending closed loose loops with the adjacent walls forming the loops being spaced apart to form excess material between and inwardly of the turns of the coil and the turns of the coil are effectively trapped in the inwardly facing fold or valley but being otherwise unattached to the tube wall.

The thus contracted carcass is then removed from the warm water bath and permitted to cool to room temperature whereby the tube wall takes a permanent set in its deeply corrugated position with the corrugations being deeper at the ends than at the mid-portion of the finished hose.

The outwardly facing fold or valley between the widely spaced turns at the ends of the tube will be deeper than between the central turns of the coil because of the wider spacing of the ends of the coil positioned a greater length of tube wall between adjacent coil turns than in the central portion of the tube.

Figure 4:
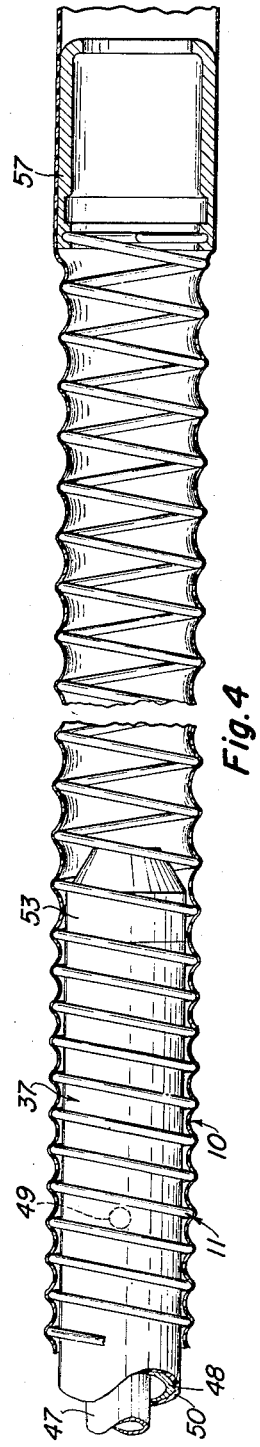
Figure 6:
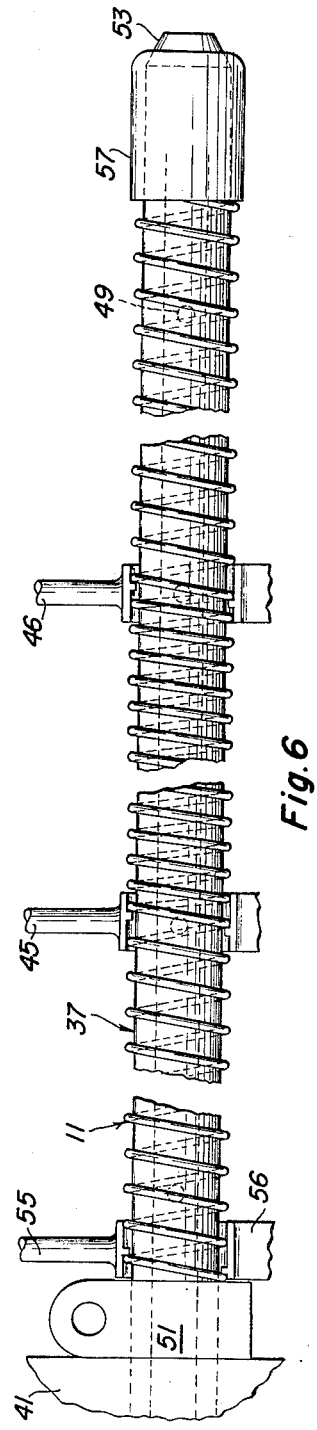
Figure 5:
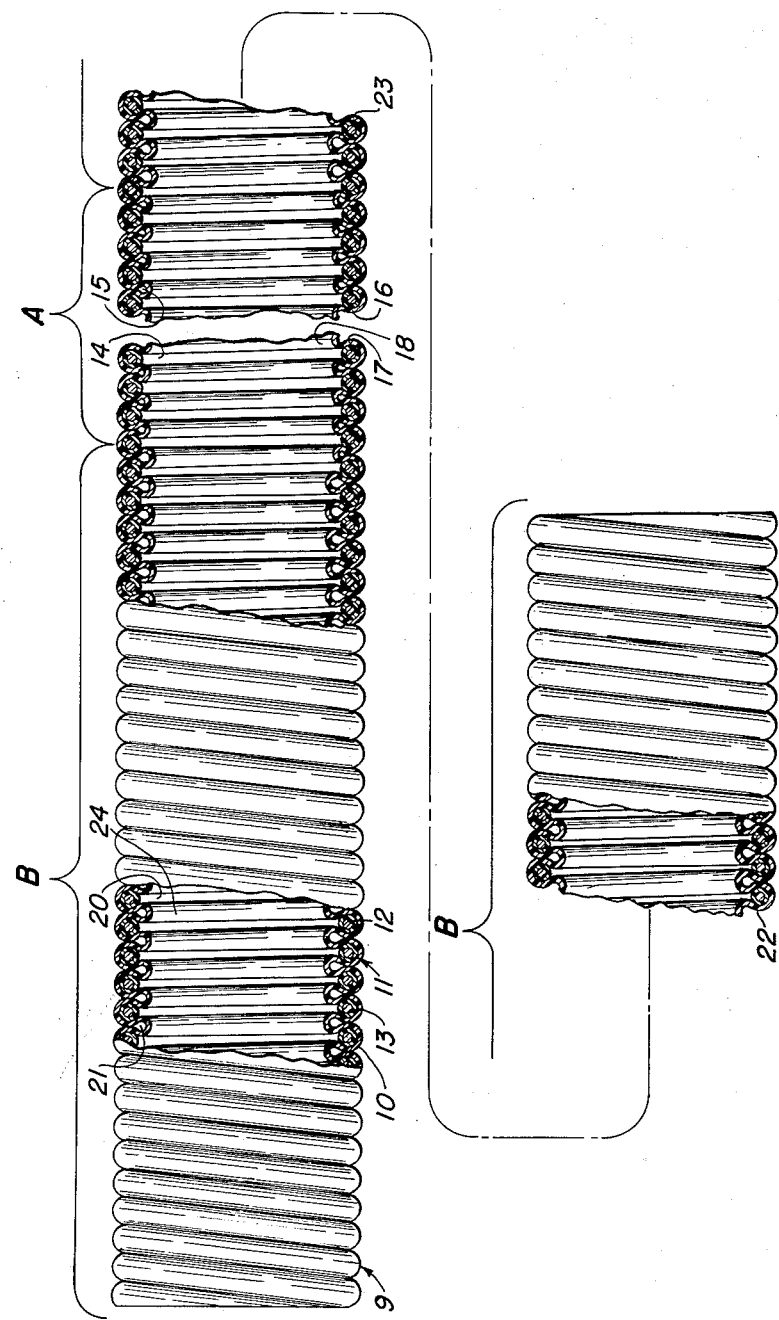

Other objects and advantages of the present invention will become apparent as the description proceeds when taken in connection with the accompanying drawings in which:

Fig. 1 is a schematic view depicting the various steps which are used in the method of the present invention, Fig. 2 is a side plan view schematically showing the assembly machine used in the method of the present invention, Fig. 3 is a view partly in section of the rear end of the arbor of the present invention showing a tube being applied, Fig. 4 is a sectional view of the hose carcass as it is about to be removed from the arbor, Fig. 5 is a sectional view of a completed hose made according to the present invention, and Fig. 6 is a view of the arbor with a reinforcing element placed thereon in its differentially spaced position.

The hose of Fig. 5 is generally indicated by the reference numeral 9 and comprises a thermoplastic tube 10 and a cylindrical spirally wound reinforcing element generally indicated by the reference numeral 11, the normal unstretched diameter of the tube 10 being less than that of the reinforcing element 11. The reinforcing element 11 comprises a cylindrical spirally wound reinforcing wire 12 and a sheath 13 of thermoplastic material covering the wire. The wire 12 may be made of steel, aluminum or other such material depending upon the use to which the hose is to be put.

As illustrated, the hose 9 comprises 3 sections having a slightly different construction, the section A and the end sections B.

In section A the tube 10 is formed into an inwardly facing spiral fold or valley 14 in which the reinforcing element 11 is positioned and an outwardly facing spiral fold or valley 15. The folds 14 and 15 are joined by walls 16 and 17 which normally lie in substantial contact with each other because the reinforcing element 11 is prestressed so that its turns tend to press against each other if free to do so. The inner wall or land 18 of fold 15 is normally positioned inwardly of the inner periphery of the reinforcing element 11 but moves outwardly as the hose 9 is stretched. In other words, the walls 16 and 17 are spaced apart inwardly of the turns of coil 11 so as to form substantially closed end loops forming excess material between and inwardly of the turns of coil 11 which excess material merely straightens out when the hose is extended.

At sections B the wall 10 is also formed with inwardly and outwardly facing folds or valleys 20 and 21, the fold 20 forming a continuation of the fold 14 of section A and the fold 21 forming a continuation of the fold 15 of section A, the reinforcing element being positioned in the fold or valley 20 at section B. The fold or valleys 20 and 21 are connected by walls 22 and 23 which also normally lie in substantial contact with each other because of the tendency of the turns of the reinforcing element to return into contact with each other. However, the fold 21 is deeper than the fold 15 of section A, its inner wall or land 24 extending radially inward beyond the land 18 of section A. The walls 22 and 23 are also spaced apart inwardly of the turns of coil 11 to form substantially closed end loops deeper than those at section A forming a greater amount of excess material between and inwardly of the turns of coil 11 which merely straightens out when the hose is extended or flexed at sections B.

The purpose of that feature is to provide greater flexibility and extensibility of the hose 9 at its ends where fittings must be attached and to provide deeper pockets in which the turns of the reinforcing element are positioned so as to prevent their displacement from one pocket to another as the hose is flexed about the ends of the necessary fittings (not shown).

The hose 9 of Fig. 5 is made by a continuous process according to the present invention. The general outline of the various stages and procedures are schematically outlined in Fig. 1. Reference numeral 30 represents an extruding station where the tubing 10 is extruded in long indefinite lengths and wound on a reel 31. The reference numeral 32 represents a second extruding station where the sheath 13 is extruded about the wire 12 also in long indefinite lengths. From the station 32 the sheathed reinforcing element 11 is led to a coiling station 33 where the reinforcing element 11 is closely wound so that its turns press against each other. The closely coiled reinforcing element 11 is then severed to the proper lengths for forming the hose 9 and placed in the spring hopper and storage rack 34. The severed lengths of coil are indicated by the reference numeral 8. It has been found that one proper length is from 39 to 40 inches and containing approximately 500 turns of coil.

The assembly station is generally indicated by the reference numeral 35 and includes a supporting frame 36, an expanding arbor or mandrel 37, a pair of pinch rolls 38 and a warm water tank 39.

The assembly station is shown in more detail in Fig. 2 and includes a roller support 40 for the rear end of arbor 37 and front supports 41 and 42 as well as supports 43 and 44 for clamps 45 and 46, the purpose of which will presently appear.

The arbor 37 includes concentric inner and outer rigid air pipes 47 and 48, the latter having openings 49 thru its wall for a purpose which will presently appear, and an expansible thermoplastic tube 50 surrounding the pipe 48. The head end of the thermoplastic tube 50 is clamped in airtight relationship to the pipe 48 by a clamp 51. The other end of the tube 50 is turned backwardly at 52 about the rear end of pipe 48 and is clamped in place by a hollow thimble 53 threaded to the end of the pipe 47 and in open communication with its interior.

In applying the tube 50 to pipe 48, one end is clamped and the tube is stretched lengthwise to the maximum extent possible and the other end then clamped while the tube is in its longitudinally stretched condition. As a result the tube 50 will be substantially nonextensible longitudinally but will be readily expansible radially and circumferentially.

A clamp 55 is supported from the frame 36 by a support 56 and serves to clamp the end coil of the reinforcing element 11 to the head end of the arbor 37 while the clamp 57 serves to clamp the tail end of the reinforcing element 11 to the mandrel in an obvious manner. A mechanical expander 54 is provided for expanding the free end of the tube 10.

The interior of pipe 47 is connected to a source of air under pressure which may be controlled by a three-way valve 58 and the space between the pipes 47 and 48 is also connected to a source of air under pressure controlled by a three-way valve 59.

The water 60 in tank 39 may be heated in a suitable manner such as by an electric heater 61 controlled by a thermostat (not shown) responsive to the temperature of the water 60.

Assembly operation

The armbor 37 being deflated a length 8 of coil 11 is placed over the arbor tube 50 by raising the rear end of the arbor to clear the roller support 40, the clamping ring 57 having been previously applied to the rear turn of the coil. The coil is then stretched lengthwise of the mandrel 37 and the other end clamped to tube 50 by the clamp 55.

It is to be noted that while clamping ring 57 and clamp 55 have been illustrated for exteriorly clamping the end turns of the coil to the mandrel, other means may be provided for anchoring the end turns relative to the mandrel 37. The coil stretching operation also may be performed mechanically by suitable mechanism mounted on the fram 36.

A selected turn of the coil adjacent each end thereof (the 30th has been found satisfactory) is moved toward the center of the arbor 37 and exteriorly clamped to the tube 50 by clamps 45 and 46. The coil is shown in the above position in Fig. 6 which shows the differential spacing of the turns, being more widely spaced at the ends than at the center. If found necessary the expanded coil may be vibrated to evenly space the turns of the coil both at the center and at the ends.

The original length of the coil 8 was from 39 to 40 inches long and contained about 500 turns, more or less, and in its stretched condition is about 207 inches long. After the above differential spacing, the end turns are approximately 0.55" apart and the central turns are spaced approximately 0.40" apart. The original length of coil 11, its number of turns, the amount of total stretch and the amount of differential stretch may be varied depending upon the characteristics of hose desired. The above figures have been found satisfactory for a suction cleaner hose.

If it is desired that only one end of the finished hose be more flexible and extensible, the turns are spaced further apart at one end only in which case one of the clamps is not needed. If it is desired that the central section of the hose be made more flexible and extensible, selected turns toward the center of the stretched coil are moved toward the end and exteriorly clamped to the expansible tube 50. If it is desired that the end turns be closely spaced selected turns adjacent the ends of the stretched coil are moved toward the end of the arbor to bring the end turns into contact with each other and the selected turns exteriorly clamped to the arbor. If it is desired that the turns be evenly spaced, the clamps 45 and 46 are not used.

Air under pressure is then applied to the interior of tube 48 by manipulation of the valve 59. The air will pass thru openings 49 and inflate the expansible arbor tube 50 against the interior of the turns of coil 11 and expand outwardly between them as shown in Fig. 2. That will interiorly anchor the turns of the coil in their differentially spaced position and the exterior clamps 55, 45 and 46 may then be released to leave the exterior of the stretched coil and arbor free for the application of the tube 10.

The free end of the tube 10 extending from the reel 31 is then inserted between the pinch rolls 38 to close off the flow of air into the length of tubing on the reel 31.

The free end of tube 10 is then mechanically expanded by the expander 54 and slid over the spring clamp 57 at the tail end of the arbor 37. Air under pressure is then applied to the interior of pipe 47 by manipulation of valve 58. The air will flow thru the nipple 53 into the interior of tube 10 and inflate it, being stopped at the pinch roll 38. The tube 10 may then be manually or mechanically pulled over the stretched reinforcing element 11, the rear end of arbor 37 being raised from the roller support 40 while that is being done.

As the tube 10 is pulled over the arbor 37, as shown in Fig. 3, the tubing 10 will be unreeled from reel 31, the pinch roll forming a sliding plug to maintain air pressure within the tube 10. As the tubing 10 is pulled over the arbor 37 and the stretched spring thereon, it will be expanded longitudinally as well as circumferentially, the actual length of unexpanded tubing used being approximately 170". When the free end of tubing 10 reaches the head end of the arbor 37 so as to cover the entire stretched reinforcing element, the air pressure within pipe 47 is released by manipulation of valve 58 which releases the pressure within the tube 10. Since the uninflated inside diameter of tubing 10 is less than that of the coil 11, the wall of the tube will contract about the turns of the coil and again exteriorly anchor them in their differentially spaced position. At the same time the walls of tube 10 will contract and enter the space between the turns of the coil 11 and form the genesis of what will eventually become the outwardly facing folds or valleys 15 and 21.

Since the turns of coil 11 are now again exteriorly anchored in their differentially spaced condition the air pressure within the pipe 48 may be released by manipulation of valve 59 deflating the expansible arbor tube 50 and releasing the internal anchor on the turns of coil 11, the tube 10 having previously been severed at the sleeve 57.

The tube 10 will tend to contract lengthwise and its inside diameter having been less than the coil 11 it will tend to contract radially and circumferentially and the wall of tube 10 will move further inwardly between the turns of the coil 11.

The coil 11 will then contract lengthwise a distance permitted by the wall of tube 10 under the tendency of the turns of coil 11 to return into contact with each other. That position of the carcass is shown in Figure 4, which shows the carcass being removed from the arbor 37, which is the following step in the process.

The carcass shown in Fig. 4 when removed from the arbor 37 is then placed in the warm water 60 within tank 39 which is maintained at a temperature of from 150° to 180° F. The heat thus applied will soften the wall of tube 10 and release the stresses therein whereby it will contract both axially and circumferentially to the extent permitted by the coil 11. The turns of coil 11 will also tend to return into contact with each other with the result that the carcass will take the posiion shown in Fig. 5 with the turns of coil 11 trapped in the pockets, formed by the inwardly facing folds or valleys 14 and 20, with the walls 16, 17, 22 and 23 which connect the folds or valleys in substantial contact with each other and in contact with and lying between adjacent turns of coil 11.

The carcass is removed after a few minutes from the tank 39 and permitted to cool to room temperature whereby the wall of the tube will take a permanent set in the position shown in Fig. 5 to complete the formation of the hose 9, the construction of which has been previously described.

It has been found that the following materials are satisfactory for making a hose according to the present invention suitable for use with suction cleaners. The reinforcing wire is preferably made of steel wire having a tensile strength of about 275,000 p. s. i., 0.058" in diameter and the sheath or coating is approximately 0.010" in thickness, making the diameter of the reinforcing element, 0.078". The tube 10 is preferably made of polyvinyl chloride having a wall thickness of from 0.022" to 0.026" and a tensile strength of 2,000 pounds per square inch at 80° F. The sheath for the wire may be made of the same material.

The length of tubing used per coil spring, while not exactly critical, is important. It has been found in practice that from 168 to 170 inches of tubing to about 512 turns of spring is suitable to form a hose which will be satisfactory for use with a suction cleaner.

The amount the coil is extended in making a hose according to the present invention determines the length of tubing which is used and also the depth of the folds or valleys which will be formed in both the central and end sections of the finished hose. It will, therefore, also determine the extent to which the finished hose may be extended. Thus, by varying the amount of stretch applied to the coil, the extensibility and flexibility of the finished hose may be varied.

The tube walls are formed with deep corrugations in which the turns of the composite reinforcing element are effectively trapped being otherwise free except for the frictional adherence between the sheath and the tube wall, the turns of the coil being separated only by the walls of the tube which form the inwardly and outwardly facing valleys.

The finished hose is readily extensible, since it is only necessary that the loops or folds in the tube be straightened out in order to extend the finished hose, there being no necessity for placing the wall of the hose under tensile stress as in previous constructions.

While the diameter of the coil, the diameter and thickness of the tube, the length of unstretched coil and the length of the tube may vary widely for making hose of different sizes and for different purposes, the following has been found very satisfactory for making suction cleaner hose according to the present invention. The coil may have an inside diameter of 1⅜" and the tube an original inside diameter of 1¼" and a thickness of 0.022". A coil having an unstressed length of from 39 to 40 inches may be used with a tube about 170 inches long.

By using parts having the foregoing dimensions and the method of the present invention, a hose having the following characteristics may be formed. When the carcass is removed from the arbor it will contract to approximately 100 inches. After it has been heat treated, it will contract to approximately 77 inches if no compressing force is applied. When a compressing force is applied it will contract to approximately 62 inches. Such a hose, by the application of a 6 pound axial pull can be stretched to 165 inches and when the force is released it will return to a free length of 77 inches and can be compressed to a length of 62 inches for storage or other purposes.

According to the method of the present invention an extensible flexible hose may be formed in which the coil turns are equally spaced along the length of the hose wherein the hose will have uniform flexibility and extensibility along its length, an extensible flexible hose may be made in which the turns of the coil are spaced more widely at the ends during manufacture wherein the finished hose will be more flexible and extensible at the ends than at the center, an extensible flexible hose may be made with the turns of the coil being spaced more widely at the center than at the ends during manufacture wherein the finished hose will be more flexible at the center than at the ends and an extensible hose may be formed in which the turns of the coil are in contact with each other at the ends and spaced from each other at the center during manufacture wherein the finished hose will be extensible at the center and substantially nonextensible at the ends.

From the foregoing it can be seen that the present invention provides a novel and simple method and apparatus by which a flexible and extensible hose may be formed in which the hose has different flexibility and extensibility along the sections adjacent the ends thereof than at the central section.

While I have shown and described but a single embodiment of my invention it is to be understood that that embodiment is to be taken as illustrative only and not in a limiting sense. I do not wish to be limited to the particular method and apparatus shown and described but wish to include all equivalent variations thereof except as limited by the scope of the claims.

I claim:

1. The method of making a readily stretchable flexible hose from a prestressed cylindrical spirally coiled reinforcing element with the turns thereof pressing against each other and a thin-walled tubing of thermoplastic material having an inside diameter less than that of the coil comprising, stretching said coil lengthwise to separate the turns thereof a substantial distance apart and to place them under a stress tending to return them into contact with each other, fixing the end turns of said stretched coil in their spaced positions, anchoring each turn interiorly to hold said turns in their spaced stretched relationship, expanding a measured length of said tubing to a diameter somewhat greater than the outside diameter of said coil, sliding said length of tubing over the entire length of said stretched coil, releasing said expanding means to cause said tubing to collapse about the turns of said coil to exteriorly clamp said turns in their spaced relationship with the wall of the tubing tending to enter the space between adjacent turns of said coil, releasing the anchor on the interior of said turns to cause them to move toward each other as far as permitted by the wall of said tubing and to cause the wall of said tubing to move inwardly in a spiral valley between said turns, applying heat to the assembly thus formed to soften the wall of said tubing and release the stresses therein and cause said turns to move closer toward each other and to cause the wall of said tubing to move inwardly in a deep spiral valley lying between said turns and lowering the temperature of the assembly to cause the wall of said tubing to take a permanent set in its deeply folded position.

2. The method according to claim 1 in which said coil is vibrated to evenly space the turns of said coil before they are internally anchored.

3. The method according to claim 1 in which the turns of said coil adjacent its ends are spaced differently before being internally anchored to form areas of differential turn spacings along the length of said coil.

4. The method according to claim 3 in which the turn spacing adjacent the end of said coil is greater than at the central portion thereof.

5. The method according to claim 4 in which said coil is also vibrated to evenly space said turns over said differentially spaced areas before being internally anchored.

6. The method of making a readily extensible flexible hose from a prestressed cylindrical spirally coiled reinforcing element with the turns thereof pressing against each other and a thin-walled tubing of thermoplastic material having an inside diameter less than that of said coil with the use of an expanding arbor of greater length than said coil comprising, placing said coil on said arbor, attaching one end turn of said coil to one end of said arbor, stretching said coil the entire length of said arbor to space the turns of said coil along the length thereof, fixing the second end of said coil with relation to the other end of said arbor, forming differentially spaced turns adjacent the ends of said coil, externally clamping the turns of said coil to said arbor at the points between the differentially spaced turns, expanding said arbor to internally anchor the turns of said coil in their differentially spaced relationship, unclamping the turns of said coil at the ends and at the points of differential spacing, inflating said tubing to a diameter greater than the outside diameter of said coil, drawing a measured length of said inflated tubing the same length as said stretched coil over the latter, deflating the said tubing to cause its wall to contract about the turns of said coil and hold them in their differentially spaced relationship with the wall of said tubing tending to enter the space between adjacent turns of said coil, contracting said arbor to release the internal anchor of said turns to cause them to move toward each other as far as permitted by the wall of said tubing and to cause the wall of said tubing between adjacent turns of said coil to move further inwardly between said turns, removing the assembly thus formed from said arbor and applying heat thereto to soften the wall of said tubing and relax the stresses therein to cause the adjacent turns of said coil to move closer toward each other and to cause the wall of said tubing to move inwardly into a deep spiral fold between the turns of said coil and lowering the temperature of the assembly to give the wall of said tubing a permanent set in its deeply folded position.

7. The method according to claim 6 in which the spacing of the turns of said coil is greater at the ends thereof before the arbor is expanded to internally anchor said turns.

8. The method according to claim 6 in which the differential spacing of said turns is carried out by selecting a turn adjacent each end of said coil and moving them toward the center thereof whereby said turns are moved farther apart at the ends and closer together centrally of said coil before they are internally anchored to said arbor.

9. The method of making an extensible flexible hose from a prestresesd cylindrical spirally wound reinforcing element with the turns thereof normally pressing against each other, and a thin-walled thermoplastic tubing having an inside diameter less than that of said coil with the use of a hollow arbor having an inflatable plastic covering for contact with the inner periphery of the turns of said coil comprising, placing said coil on said arbor, stretching said coil along the length of said arbor to space the turns thereof so that they will tend to return into contact with each other, fixing the end turns of said coil in spaced relationship to each other while said coil is in its stretched condition, inflating the covering of said arbor to bring it into contact with the inner periphery of said spaced turns to interiorly anchor them in their spaced positions, releasing at least one end turn of said coil, inflating a length of tubing, assembling said inflated length of tubing over said arbor and stretched reinforcing element, deflating said length of tubing to cause the wall thereof to contract about the spaced turns of said coil and tend to enter the space between said turns, deflating the covering for said arbor to release the inner peripheries of said spaced turns to cause them to move toward each other as far as permitted by the wall of said tubing and to cause the wall of said tubing to move inwardly between said spaced turns, removing said assembly from said arbor, applying heat to said assembly to relax the stresses in the walls of said tubing so as to cause the assembly to collapse with the wall of said tubing lying in a deep spiral fold between the contracted turns of said coil and lowering the temperature of the assembly to give the wall of said tubing a permanent set in its collapsed condition.

10. The method according to claim 9 in which said coil is vibrated to evenly space the turns thereof along said arbor prior to inflating the covering of said arbor to internally anchor said turns in their spaced positions.

11. The method according to claim 9 in which the turns of said coil are differently spaced at the ends of said coil than centrally thereof prior to the inflation of the covering of said arbor to internally anchor said turns in their spaced relationship.

12. The method according to claim 11 in which the turns separating the lengths of differential spacing of said turns are exteriorly clamped to said arbor prior to the inflation of the covering of said arbor.

13. The method according to claim 12 in which said coil is also vibrated to evenly space the turns of said coil along the lengths of differential spacing prior to the inflation of the covering of said mandrel.

14. The method according to claim 9 in which the expanding and assembling steps comprise, closing one end of said length of tubing, mechanically expanding the other end of said length to a diameter slightly larger than the outside diameter of said coil and arbor, applying said expanded end of tubing over one end of said arbor and applying air under pressure into the interior of said length of tubing from said hollow arbor while sliding said length of tubing over said stretched coil.

15. The method of making an extensible flexible hose from a prestressed cylindrical spirally coiled reinforcing element and a thin-walled tubing of thermoplastic material having an inside diameter less than that of said coil comprising, stretching said coil so that the turns thereof are spaced apart and will tend to move toward each other when free to do so, fixing the end turns of said coil in spaced apart relationship while said coil is in its stretched condition, internally fixing the turns of the stretched coil in their spaced relationship, releasing the end turns of said coil, expanding a length of said tubing to a diameter greater than the outside diameter of said coil, assembling said length of tubing over said stretched coil, releasing the wall of said length of tubing for contraction about said spaced turns to anchor them in their spaced relationship, releasing the interior fixing of said spaced turns to cause them to move toward each other a distance permitted by the wall of said tubing and to cause the wall of said tubing to move inwardly between the turns of said coil, applying heat to the assembly thus formed to relax the stresses in the wall of said tubing and cause the assembly to collapse with the wall of said tubing lying in a deep spiral fold between the turns of said coil, and lowering the temperature of the assembly to apply a permanent set to the wall of said tubing while in its deeply folded position.

16. An expansible arbor for use in the manufacture of extensible hose in which it is necessary to interiorly anchor the turns of a stretched cylindrical spirally wound reinforcing element against displacement and to supply air under pressure to inflate a thermoplastic tube as it is drawn lengthwise over the stretched coil comprising, rigid elongated concentric inner and outer tubes which form an inner open-ended air passage within the inner tube and an annular closed-end air passage between the inner and outer tubes, an expansible tube contracted about said outer tube and sealed thereto at its opposite ends, the periphery of said outer tube being appertured beneath said expansible tube and means for supplying air under pressure to each of said air passages.

17. An expansible arbor according to claim 16 in which said expansible tube is peripherally expansible and nonexpansible axially whereby it will bulge outwardly between adjacent turns of the coil to hold them in their spaced relationship but will not stretch lengthwise as the tube is pulled over the arbor.

18. The method of making an extensible flexible hose comprising, extruding a continuous length of thin-walled thermoplastic tubing, storing said extruded tubing on a reel for future use, extruding a thin sheath of thermoplastic material about a continuous length of reinforcing wire, coiling said sheathed reinforcing wire into a close wound cylindrical coil having an inside diameter greater than that of said tubing with the turns of the coil pressing against each other, severing said coiled sheathed wire into lengths suitable for making hose of the length desired, stretching a severed length of said closely wound coil to separate the turns thereof, fixing the turns of said coil in their stretched condition, inflating a length of said tubing while removing it from said reel, assembling said inflated tubing over said stretched coil, deflating said tubing to cause the walls thereof to contract about the turns of said coil to thus hold them in their separated position, releasing the turns of said coil from their stretched condition to cause them to move toward each other to the extent permitted by the walls of said tubing and heating the wall of said tubing to release the stresses therein and soften it to cause the turns of said coil to further move toward each other and to cause the wall of said tubing to move between the turns of said coil into a deep spiral fold.

19. The method according to claim 18 in which said fixing step comprises interiorly anchoring the turns of said coil in their spaced relationship.

References Cited in the file of this patent

UNITED STATES PATENTS

| | | |
|---|---|---|
| 1,774,983 | Loughead | Sept. 2, 1930 |
| 2,176,762 | Forbes | Oct. 17, 1939 |
| 2,272,704 | Harding | Feb. 10, 1942 |
| 2,560,369 | Roberts | July 10, 1951 |
| 2,609,002 | Meissner | Sept. 2, 1952 |